United States Patent [19]

Henrard et al.

[11] Patent Number: 4,503,299
[45] Date of Patent: Mar. 5, 1985

[54] CONTROL-LEVER FOR A GAME

[75] Inventors: José Henrard; Marie-Noëlle Jacquemin; Michel Leduc, all of Paris, France

[73] Assignee: Thomson-Brandt, Paris, France

[21] Appl. No.: 404,493

[22] Filed: Aug. 2, 1982

[30] Foreign Application Priority Data

Aug. 7, 1981 [FR] France .................. 81 15364

[51] Int. Cl.³ .................................. H01H 35/02
[52] U.S. Cl. .................. 200/61.52; 200/6 A; 200/61.47; 200/DIG. 29; 273/DIG. 28
[58] Field of Search ............. 273/DIG. 28, 85 G, 18, 273/313; 200/61.45 R, 61.45 M, 61.46, 61.47, 61.48, 61.49, 61.5, 61.51, 61.52, 61.53, 61.11, 220, 61.85, 157, 61.0, 61.1, DIG. 29; 307/10 AT, 121; 340/669

[56] References Cited

U.S. PATENT DOCUMENTS

| | | | |
|---|---|---|---|
| 1,855,581 | 4/1932 | Meade | 200/61.52 |
| 1,908,430 | 5/1933 | Lapsley | 200/148 |
| 2,099,483 | 11/1937 | Hinde | 200/61.52 X |
| 2,127,753 | 8/1938 | Radtke | 200/61.52 |
| 2,744,976 | 5/1956 | Black | 200/61.46 X |
| 2,758,195 | 8/1956 | Ludwig | 200/61.52 X |
| 2,823,367 | 2/1958 | Huron | 200/61.47 X |
| 3,108,750 | 1/1962 | Hill | 200/157 X |
| 3,348,844 | 10/1967 | Lemelson | 200/61.11 X |
| 3,601,729 | 8/1971 | Hierta | 200/61.52 |
| 3,787,647 | 1/1974 | Hughes | 200/220 |
| 3,809,395 | 5/1974 | Allison, Jr. et al. | 273/313 |
| 3,876,850 | 4/1975 | Amberny | 200/220 |
| 4,377,210 | 3/1983 | Monte | 200/61.52 X |

FOREIGN PATENT DOCUMENTS

| | | |
|---|---|---|
| 2320974 | 11/1974 | Fed. Rep. of Germany . |
| 1033121 | 3/1952 | France . |
| 1390318 | 1/1965 | France . |
| 2339947 | 8/1977 | France . |
| 2428316 | 1/1980 | France .................. 200/220 |
| 911151 | 11/1962 | United Kingdom . |
| 1048121 | 11/1966 | United Kingdom . |

Primary Examiner—A. D. Pellinen
Assistant Examiner—Morris Ginsburg
Attorney, Agent, or Firm—Cushman, Darby & Cushman

[57] ABSTRACT

A control-lever for a game in which a movable object is displaceable by gravity to operate a detector. In one embodiment the movable element is a pendulum and in a second embodiment the element is a ball rolling in one or more channels. The ball can be a solid object or a ball of mercury.

3 Claims, 31 Drawing Figures

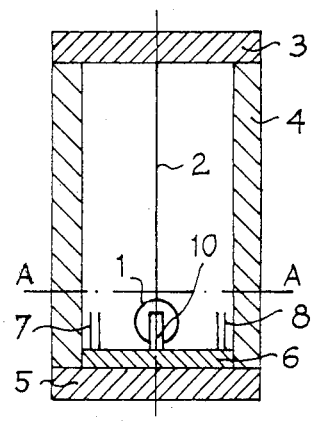
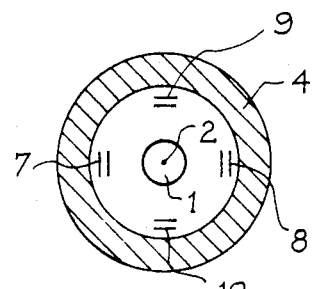
Fig. 1a
Fig. 1b
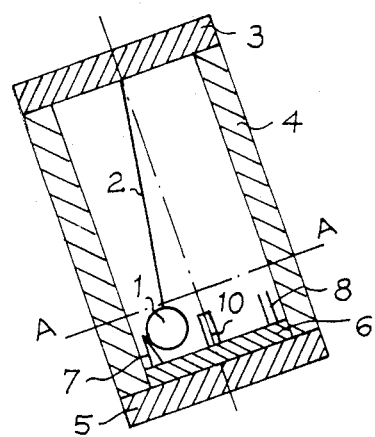
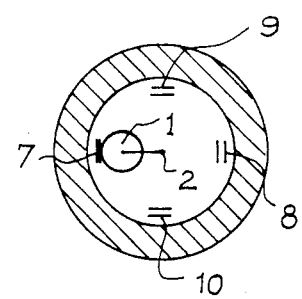
Fig. 1c
Fig. 1d
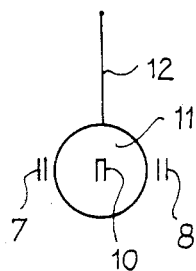
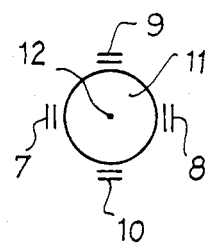
Fig. 2a
Fig. 2b
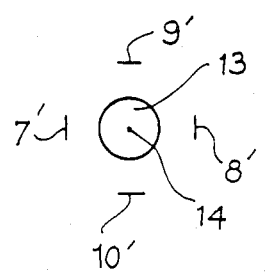
Fig. 3

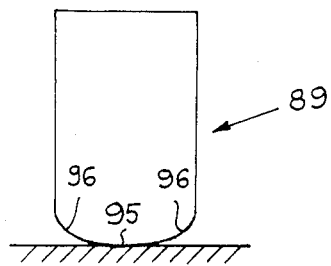
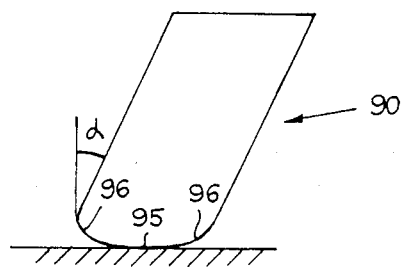
Fig. 17a Fig. 17b
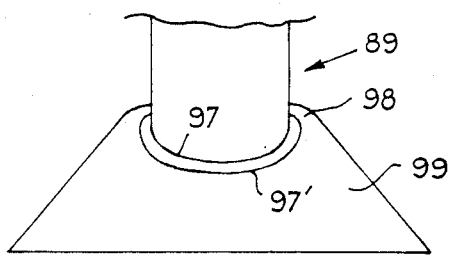
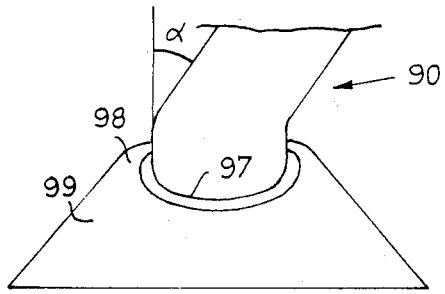
Fig. 18a Fig. 18b
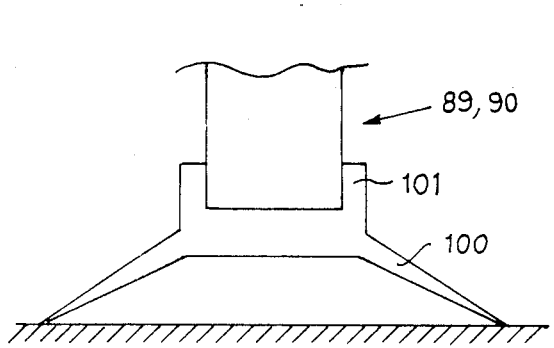
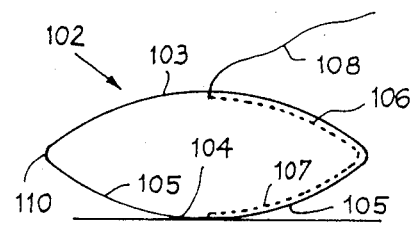
Fig. 19 Fig. 20

CONTROL-LEVER FOR A GAME

DEFINITION OF THE GENERAL FIELD OF THE INVENTION

The present invention relates to a device consisting of a control-lever, control stick or control-grip for a game. Such a device converts at least one position into electric information, under the action of at least one movable element adapted to act on at least one detector, and is mainly used in the field of electric games played on a screen, in order to control on the screen the displacement of a reference point. It may aso be used for controlling the displacement of an object.

BACKGROUND OF THE INVENTION

A control-lever for a game that is returned by a spring towards a rest position and that actuates a series of contacts placed in a housing has already been described. The operator in such known devices must hold the housing in one hand and actuate the control-lever with the other hand. The control-lever usually comprises, furthermore, a manual switch that is positioned on the housing and that is actuated by the thumb of the hand holding the housing.

SUMMARY DEFINITION OF THE INVENTION

The present invention relates to a control-lever that can be entirely manipulated with a single hand.

The invention thus relates to a device consisting of a control-lever, control stick or a control-grip for a game, converting at least one position into information under the action of at least one movable element adapted to act on at least one detector, characterized in that the movable element and the said detector are movable relatively under the effect of gravity, when modification of the orientation of the control-lever in at least one determined position occurs, and/or under the effect of inertia when displacement of the control-lever in at least one determined plane occurs.

According to one embodiment of the invention, the movable element is a pendulum that, according to a particular embodiment, is adapted to act on more than one detector.

According to another embodiment of the invention, a movable element is constituted by an object that is displaced by rolling between a rest position and a position in which it acts on at least one detector. This can be a ball, displaceable in at least one groove or channel, preferably, a sloping groove, or on the frustum of a cone, the rest position being constituted by a flattened part or a stop.

According to another embodiment of the invention, a movable element is constituted by a liquid, for example, the mercury of a mercury bulb, preferably inclined at a determined angle when the device is in the position known as rest position. A single bulb can comprise a plurality of detectors, each corresponding to a privileged sloping direction of the bulb.

The detector can be a double-blade electric contact, a plain electric contact, a magnetic contact or an opto-electronic contact.

According to a preferred embodiment of the invention, a device according to the invention comprises a housing of which the lower wall is provided with a flattened part corresponding to a rest position of the device. For example, it comprises a lower face provided with a flattened central part surrounded by a rounded part and an upper face also having a general rounded shape, the whole having a general flattened shape.

A device according to the invention can have a general cylindrical shape and present at least one upper face sloping with respect to the plane orthogonal to the generators of the cylinder.

A device according to the invention can be associated to a support cooperating with the lower part of said device, so as to ensure a resilient return towards its rest position. A device according to the invention can thus be associated to a support provided with an elastic fold, a ball-and-socket joint, or forming a vacuum-cup.

BRIEF DESCRIPTION OF THE DRAWINGS

The invention will be better understood by reading through the following description which is given by way of non-limitative illustration and by referring to the figures in which:

FIGS. 1a to 1d, 2a, 2b and 3 represent embodiments of a first variant of the invention;

FIGS. 16a, 16b, 17a, 17b, 18a, 18b, 19 and 20 represent devices according to the invention, preferably used with a support.

DETAILED DESCRIPTION OF ONE EMBODIMENT OF THE INVENTION

Figure 4:
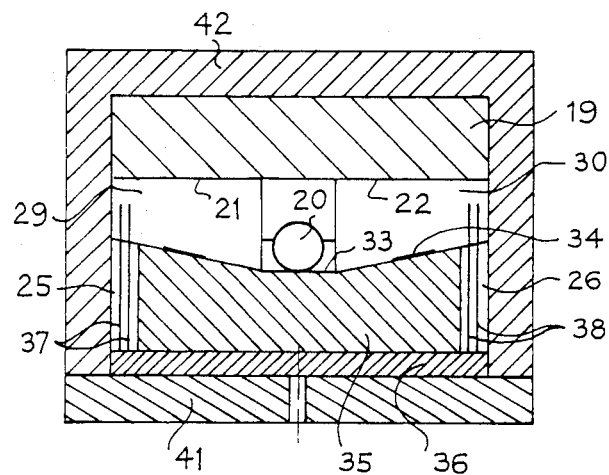
FIGS. 4, 5a, 5b, 6 to 13 represent embodiments of a second variant of the invention.

The control-lever or control-grip for a game in FIG. 1a (shown in section along a vertical plane) comprises a pendulum 1 suspended by a wire 2, preferably semi-rigid or rigid, to a lid 3 positioned on a general cylindrical housing 4, designed to be held in the operator's hand.

On the lower part of the body 4, is positioned a bottom 5 supporting a printed circuit 6 bearing double-blade contacts 7 to 10 as well as conductive links (cf. also FIG. 1b that corresponds to a section of FIG. 1a along plane AA). FIGS. 1a and 1b represent the control-lever or control-grip in rest position when its axis is vertical, whereas FIGS. 1c and 1d show, also in section, the same control-lever, in a sloping position in the section plane of FIG. 1a. The double-blade contact 7 is closed by the pendulum 1, since the sloping of body 4 produced a relative movement between the pendulum and the contact 7. Pendulum 1 is therefore a movable element with respect to contacts 7 to 10. It also constitutes a movable element in itself; indeed, if the housing is sloping at the exact angle necessary for the closure of the contact 7, the axis of wire 2 of the pendulum 1 will remain vertical. On the other hand, if the inclination of housing 4 is pursued in order to increase this angle, pendulum 1 will be retained by the stop that constitutes contact 7 and, consequently, wire 2 will, in turn, have its axis sloped or inclined.

The closure of a contact such as contact 7 can also be obtained by subjecting housing 4 to a sudden displacement along the horizontal plane, the contact thus closing due to the inertia of the pendulum.

FIGS. 1a to 1d show an arrangement in which pendulum 1 having a small diameter is suspended by a relatively long wire 2. Under these conditions, only one of the four contacts 7 to 10 can be closed at a time, which is prejudicial to precision, unless the number of said contacts is increased. FIGS. 2a and 2b also show, respectively, from a lateral view and from above, an embodiment in which the pendulum 11 having a relatively large diameter, is suspended by a wire 12, which may or may not be relatively short. This positioning allows the pendulum 11 to close one or two contacts, according to the direction of the slope, which thus allows in praxis localization of eight principal directions with four contacts, and thus visualization on the screen of the horizontal, vertical and diagonal displacements. Furthermore, the path of the pendulum being reduced, the reply of the control-lever is more rapid, whether operation occurs by inclination or by inertia, and there is less risk of interference through rebounding.

FIG. 3 represents a view from above of an embodiment in which the contacts 7' and 10' are single blades. In this case, pendulum 13 and its wire 14 are conductors so as to constitute a second pole for the electric contact.

FIG. 4 represents a vertical section of a variant in which the movable element is constituted by at least one ball 20. A housing 42 comprising an upper part forming a lid and a lateral cylindrical part is associated to a bottom 41. Bottom 41 bears a printed circuit 36 on which are positioned four elements designed to detect the presence of ball 20, for example, four double-blade contacts of which two, 37 and 38 are visible on FIG. 4. The ball 20 rolls on a frustum of a cone positioned on the upper part of a support 35 that is generally cylindrical and its rest position is realized through a flattened part 33 positioned on the side of the apex of the cone.

Figure 5B:
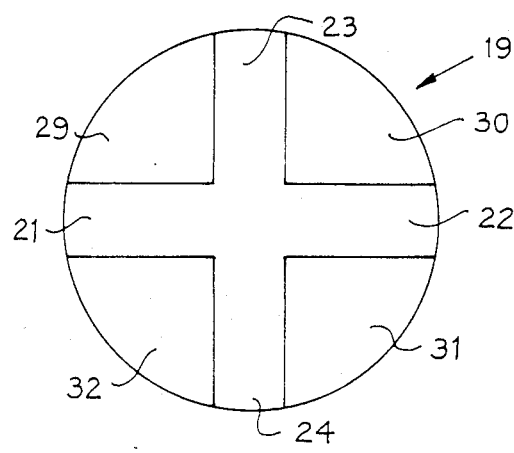
Figure 5A:
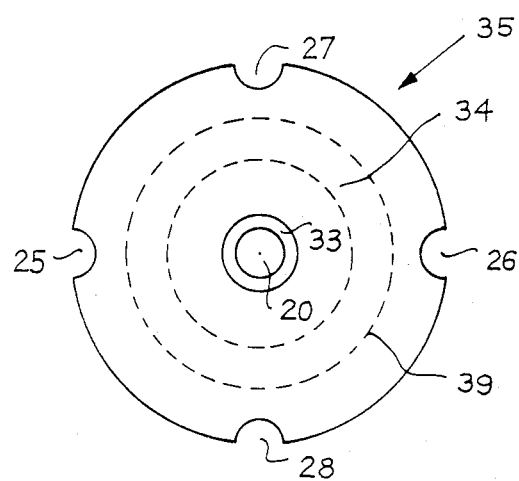

FIG. 5a shows support 35 seen from above and reference will also be made to it herein-under. Support 35 generally has a cylindrical shape, its lower part being at least partially flat and in contact with the printed circuit 36. It bears four cuts 25 to 28 parallel to its axis which is that of the frustum of a cone in order to let the contacts pass. The movement of the ball 20 is channeled laterally along channels 21 to 24 of a holding part 19 that is represented in a view from below in FIG. 5b. The edges of channels 21 to 24 are constituted by four outlines or cut-outs forming a hypothetical frustum of a cone of which the materialization is interrupted by channels 21 to 24, and which is complementary to the frustrum of the cone. Consequently, when the assembly is mounted, outlines or cut-outs 29 to 32 abut on the frustum of the cone and double-blade contacts go beyond cuts 25 to 28 of support 35 so that at least one of them can be closed by the ball when the inclination of housing 42 is adequate. It is possible to replace the double-edge contacts by plain electric contacts, for example, a blade. In this case, the ball is conductive and is adapted to roll on a conductive track constituting a second contact pole, at least when the ball is in contact with a plain contact. With this purpose, a conductive ring 34 has been shown in FIGS. 4 and 5a.

A ball device can also be adapted to operate by inertia, through sudden displacement along the horizontal plane.

Figure 6:
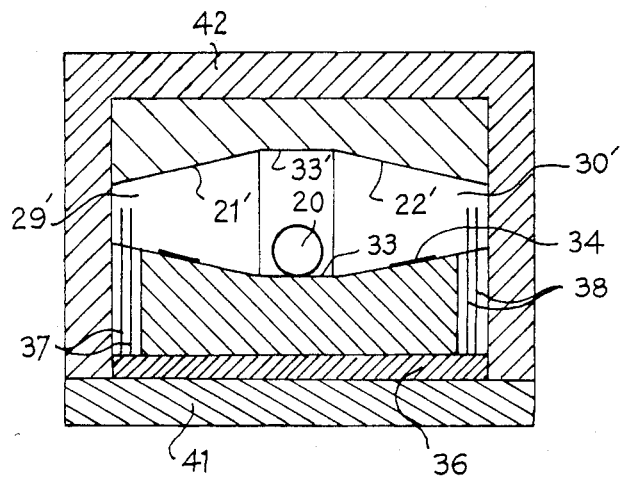

FIG. 6 shows, also along a vertical section, a modified version of FIG. 4 in which channels 21 to 24 are also sloped with the same apex angle as the frustum of the cone or with a different angle and extending by a central flattened part 33' so that the control-lever can be indifferently used in a position called normal or in a returned position.

Figure 7:
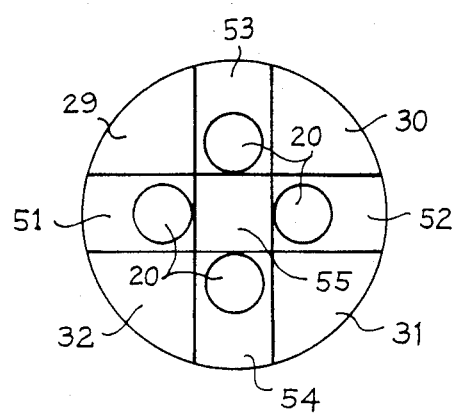

FIG. 7, in a view from below, represents a modified version of part 19 of FIG. 4 (or of its counter-part in FIG. 6) in which four balls 20 are each positioned in a channel 51 to 54, the different channels being separated by a central contact piece 55 forming a stop or abutment. By way of variant, this piece 55 is used without part 35 and with stop 55 directed upwardly, channels 51 to 54 being preferably inclined.

Figure 8:
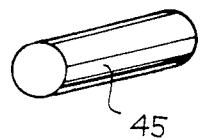
Figure 9:
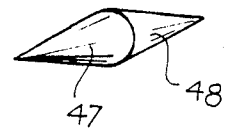

The ball or balls 20 can be replaced by other objects displaceable by rolling, for example, a cylinder 45 (FIG. 8) or two cones 47, 48 put end to end (FIG. 9).

Furthermore, the eventual angle of inclination of the channels with respect to the horizontal must be limited so that too wide a slope of the housing is not prescribed in order to prevent too wide movements and too sharp rebounding. If the angle is too small, the sensitivity of the device risks being too great and consequently its use requires too much attention. In praxis, an inclination angle in the range of 10° is satisfactory.

Figure 10:
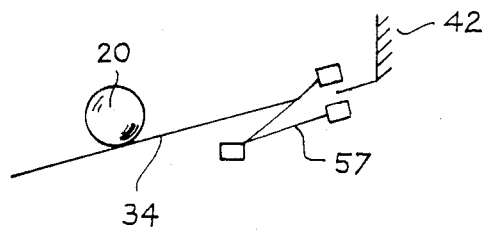
Figure 11:
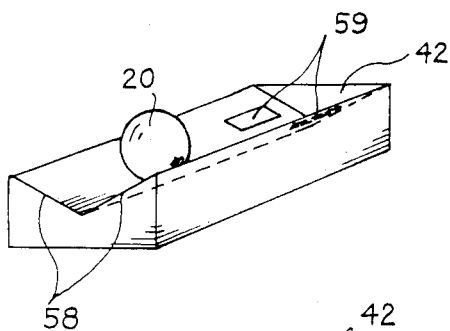

Furthermore, (cf. section of FIG. 10) the position detection can be made at the level of the lower part of the guide on which rolls ball 20 (for example, due to double-blades 57) or again laterally (cf. perspective view FIG. 11), and in this case, rolling guide 58 has preferably a V-shaped outline if a ball is used.

Two conductive contacts 59 are represented, closed by the abutment of ball 20 made of a conductive material.

Figure 12:
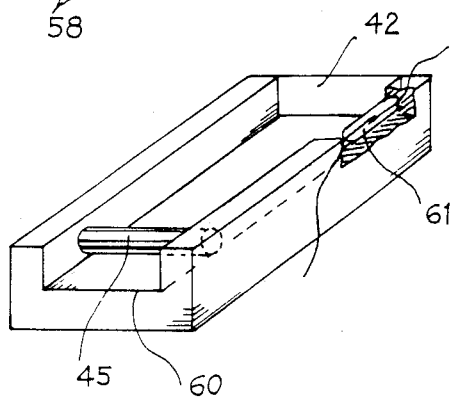

In FIG. 12, also in perspective, a magnetized roller 45, positioned in a slit 60 forming a guide has its abutment detected by a magnetic contact 61 constituted by a flexible blade switch.

Figure 13:
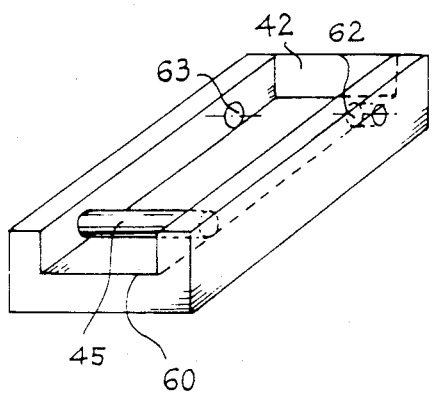

In FIG. 13, also shown in perspective, detection is carried out by an opto-electronic transmitter-receiver, through interruption of the luminous beam.

Figure 14:
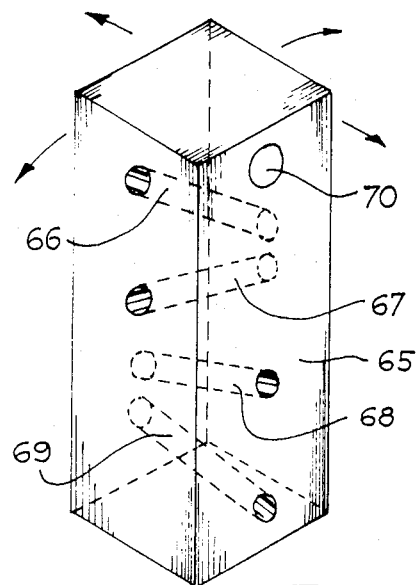
FIGS. 14 and 15a to 15d represent embodiments of a third variant of the invention.
Figure 15A:
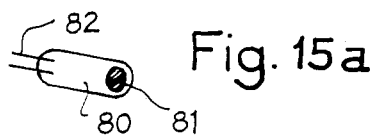

FIG. 14 represents, in perspective, a variant of the invention allowing the lateral dimension of the control-lever to be minimized so that it can be easily seized in the palm of the hand. In order to do this, the different detectors are superimposed. The control-lever 65 is provided with four sloped holes or borings 66 to 69, recessed or through holes, positioned in the four directions corresponding to that of the four guides described herein-above. These borings are adapted to receive the individual balls, or roller devices as well as similar devices such as those described herein-above or, also, devices such as mercury bulbs. A mercury bulb is represented in FIG. 15a and comprises a glass bulb 80, and two contacts 82 that can be short-circuited by a mercury ball 81. The short-circuit can be obtained by a slope appropriate to the bulb 80, or again by inertia in subjecting the bulb to a sudden axial movement.

Such a device is adapted to operate by inclining it in the four directions indicated herein-above, with closures of one contact or in the intermediary directions with simultaneous closure of two contacts. It can also operate through inertia, by sudden displacement along the horizontal plane. A switch 70 is, furthermore, provided at the upper end of one of its faces so as to constitute, for example, a shoot control for games simulating military operations.

Figure 15B:
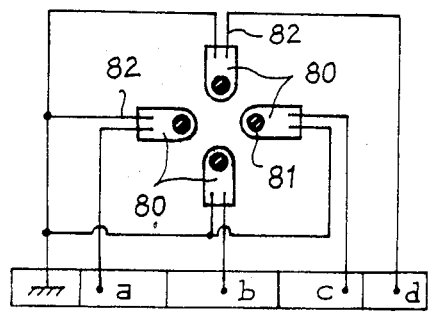

FIG. 15b represents an assembly diagram of four mercury bulbs each provided with a glass bulb 80, a mercury ball 81 and a contact 82. These bulbs are preferably inclined in converging directions, so as to define four sloping displacement directions for the mercury balls 81, in a manner similar to the case of FIG. 7. One of the poles of each contact 82 of each bulb constitutes a common point (on earth), the other pole constituting the active pole, respectively a, b, c and d, designed to detect the short-circuits of contacts 82. An assembly formed of four bulbs of FIG. 15b adapts itself particularly well to a superimposed assembly embodiment. In the case of FIG. 14, each boring 66 to 69 receives a mercury bulb.

Figure 15C:
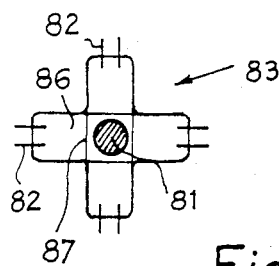

FIG. 15c represents a view from above of an embodiment in which a single bulb 83 comprises four branches 86, preferably inclined, each of which bears a contact 82, and a single mercury ball resting on a flattened part 87.

Figure 15D:
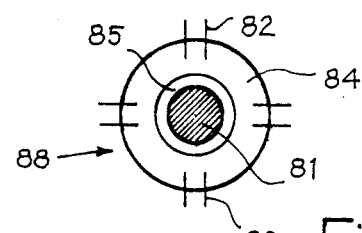

FIG. 15d is an embodiment of the invention in which a single bulb 88 presents a conical part 84, as well as flattened part 85 and a plurality (in this case four) of spaced contacts 82. The relative dimensions can be selected so that the ball closes one or two contacts.

Figure 16A:
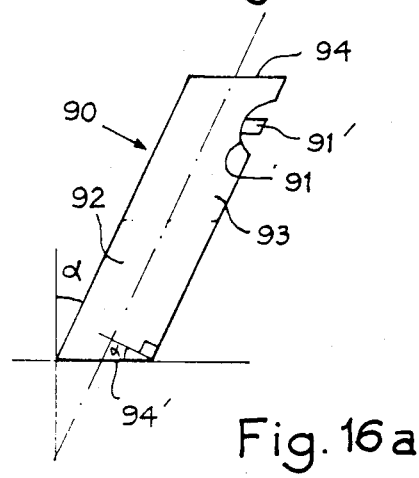
Figure 16B:
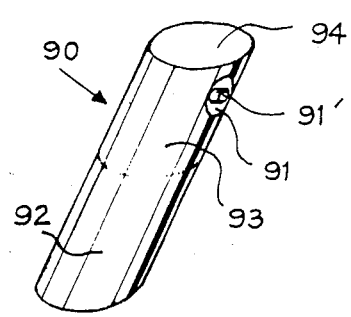

According to the lateral view of FIG. 16a, and the corresponding view from above 16b, an improved device 90 designed to be held in the palm presents at least one of its upper and lower faces 94 and 94′ inclined at an angle α with respect to the plane orthogonal to the generator-lines of the cylinders defining the control-lever. Thus, when the control-lever is held in the hand in rest position, faces 94 and 94′ being horizontal, the longitudinal axis of said lever form an angle α with the vertical. This angle is selected approximately equal to 20° or 25°, which corresponds approximately to the advance shifting of the recess that defines the palm of the closed hand when the forearm is horizontal and the wrist in normal position. Under these conditions, the adjusting of the rest position of the control-lever is facilitated since said position corresponds to the rest position of the hand. FIG. 16b shows more clearly the section of the control-lever or grip for a game. It comprises a front part 93 having a rounded shape favoring the hand hold or grip. At the end the most advanced towards the front, i.e. the end where the angle beween the generator-lines of the front part and the plane 94 is the smallest, the front part 93 bears a cavity 91 in which is housed a switch 91′. The rear part and the lateral walls 92 can have a general rounded shape. The lower face 94′ can be formed in such a way that the control-lever can be placed on said face without falling.

FIG. 17a represents a lateral view of a control-lever 89 for a game that can be placed on a support (table, arm, etc . . . ) and with this purpose presents on its lower part a flattened part 95 surrounded by a rounded portion 96. When the flattened part 95 of control-lever 89 is placed on a horizontal support, the lever is in rest position. It can be sloping in all directions by rolling on the rounded part 96. Rest position can be restored at any moment due to the flattened part 95. This realization can, of course, (cf. FIG. 17b) apply to a control-lever 90 inclined or sloped at an angle of α towards the front.

According to the section of FIG. 18a, a control-lever 89 is inserted in an elastic fold 98 of a support 99. Its lower part 97 is preferably at least in part rounded so as to allow its rotation like a ball-and-socket joint in a notch corresponding to support 99. The elastic fold 98 ensures a resilient return of the control-lever in the rest position. In FIG. 18b, this realization is applied in the case of a control-lever for a game sloping at an angle α towards the front.

According to a variant (not shown), the lower part of a control-lever according to the invention can cooperate with a ball-and-socket joint that is returned, in a manner known per se, towards its position of equilibrium, by an elastic membrane.

FIG. 19 represents a section of a control-lever 89, 90 for a game that may or may not be inclined at an angle towards the front associated to a support 100 forming a vacuum-cup. It is integrally fixed with the vacuum-cup 100, for example, by slightly gripped fitting in a cylindrical part 101. The vacuum-cup 100 is fixed by pressure on a horizontal support and exerts, due to its elasticity, a return force on the control-lever towards its position of equilibrium.

FIG. 20 shows a lateral view of a control-lever 102 for a game having a generally flattened shape and that can have different types of detectors and movable elements described herein-below. It comprises one lower face provided with a central flattened part 104 surrounded by a rounded part 105. The upper face 103 also has a rounded shape. Connection surface 110 between the upper and lower faces corresponds approximately to the connection of the two parts of a sphere. The wire exits at the apex of the upper face 103, or again at the level of the surface 110. In this latter case, the exit is direct or with tracking of the wire either along the cut 106 provided in the upper face 103, or along a cut 104 provided in the lower face (104, 105).

The orientation of the control-lever 102 for a game in all directions thus occurs with the palm of the hand placed on the upper face 103. The flattened part 104 defines a rest position of the control-lever 102 when it is in contact with the horizontal support, for example a table.

The present invention is not limited to the embodiments described herein-above. Therefore, in each of the embodiments of the movable element, it is possible to use practically detectors other than those specifically represented. It is also possible to associate to a pendulum an opto-electronic or magnetic contact, of further associate to a mercury bulb an opto-electronic contact. Furthermore, a device according to the invention can comprise different types of detectors and/or different types of movable elements. Further, a control-lever presenting a flattened part can, where necessary, be associated, according to the wishes of the operator, with different types of supports ensuring a resilient return.

We claim:

1. A control stick for a game comprising:

a housing;

support means within said housing having a frusto-conical surface with a flattened central area defining a rest area with at least four channels in said frusto-conical surface displaced from each other by 90° and inclined with respect to the horizontal when said housing is in a reference orientation and extending from common rest position at said rest area;

detecting means mounted at a position of each said channel remote from said common rest position for each indicating displacement of said stick in one of four directions;

a ball within said housing for rolling movement along any of said channels from said rest position in response to manual movement of said housing from said reference orientation and for causing a different control signal to be produced when said ball rolls into contact with each one of said detecting means.

2. A stick as in claim 1 including second means disposed opposite said support means and having a frusto-conical surface with a flattened central area at a common rest position defining a rest area and at least four channels in said frusto-conical surface of said second means displaced from each other by 90° and inclined with respect to the horizontal when said housing is in said reference orientation and extending from said rest area of said second means, the inclination of said channels of said second means being opposite the inclination of said channels of said support means so that said ball rolls from the rest position of said second means along any of said channels of said second means in response to manual movement of said housing and a different control signal is produced when said ball rolls into contact with each one of said detecting means.

3. A stick according to claim 1, wherein at least one of the detecting means is a double-blade electric contact.

* * * * *